(12) United States Patent
Chung

(10) Patent No.: US 7,441,890 B2
(45) Date of Patent: Oct. 28, 2008

(54) FRAME ASSEMBLY FOR EYEGLASSES

(75) Inventor: Chih-Chun Chung, Taipei (TW)

(73) Assignee: Hua Yang Manufacturer (ShenZhen), ShenZhen, Guangdong (CN)

( * ) Notice: Subject to any disclaimer, the term of this patent is extended or adjusted under 35 U.S.C. 154(b) by 3 days.

(21) Appl. No.: 11/636,543

(22) Filed: Dec. 11, 2006

(65) Prior Publication Data

US 2007/0291221 A1    Dec. 20, 2007

(30) Foreign Application Priority Data

May 30, 2006    (CN)    .................. 2006 2 0117876

(51) Int. Cl.
*G02C 5/14* (2006.01)

(52) U.S. Cl. .................. 351/116; 351/111; 351/153; 16/228

(58) Field of Classification Search ................ 351/116, 351/111, 153, 140, 41, 158; 16/228
See application file for complete search history.

(56) References Cited

U.S. PATENT DOCUMENTS

| 3,155,982 | A | * | 11/1964 | Baratelli | ................... 2/12 |
| 3,744,887 | A | * | 7/1973 | Dunbar | ................... 351/153 |
| 5,847,801 | A | * | 12/1998 | Masunaga | ................... 351/153 |
| 7,344,242 | B2 | * | 3/2008 | Habermann | ................... 351/156 |

* cited by examiner

*Primary Examiner*—Hung X Dang

(57) ABSTRACT

A frame assembly for eyeglasses includes a frame including two rims and two extensions that extend from two ends of the frame. Each extension has two slots. Two connection members each have a board and two lugs that extend from one side of the board. Each lug has a hole defined therethrough. The two lugs of each connection member are inserted into the two slots corresponding thereto. Two temples each have a first slit defined longitudinally in one end thereof so as to define two flexible parts. Each part has a protrusion extending from an outside thereof and the two flexible parts of each temple are located between the two lugs of each connection member and the two protrusions are engaged with the two holes of the two lugs of each connection member.

2 Claims, 4 Drawing Sheets

FRAME ASSEMBLY FOR EYEGLASSES

BACKGROUND OF THE INVENTION (1) Field of the Invention

The present invention relates to a frame for eyeglasses and more particularly, to a frame assembly wherein the temples are removably connected to the frame without soldering and bolts.

(2) Description of the Prior Art

A conventional frame assembly for eyeglasses generally includes a frame with two rims for lenses being engaged with the rims and two temples that are pivotably connected to two hinges connected to two ends of the frame. The hinges are made by metal material and have to be connected to the frame by removing some material of the frame by high temperature and the two temples are connected to the hinges by two bolts. The bolts are easily loosened and they are so tiny and difficult to find if the bolts drop from the hinges. Besides, the connection of the hinges and the frame reduces the thickness of the frame and the thickened portions become weak areas and might be broken.

The present invention intends to provide a frame assembly for eyeglasses wherein the temples are snapped to the frame directly without using hinges and bolts.

SUMMARY OF THE INVENTION

The present invention relates to a frame assembly for eyeglasses and comprises a frame including two rims and a bridge connected between the two rims. Two extensions extend from two ends of the frame and each have two slots. Two connection members each have a board and two lugs extend from one side of the board. Each lug has a hole defined therethrough and the two lugs of each connection member are inserted into the two slots corresponding thereto. Two temples each have a first slit defined longitudinally in one end thereof so as to define two flexible parts, each part has a protrusion extending from an outside thereof. The two flexible parts of each temple are located between the two lugs of each connection member and the two protrusions are engaged with the two holes of the two lugs of each connection member.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
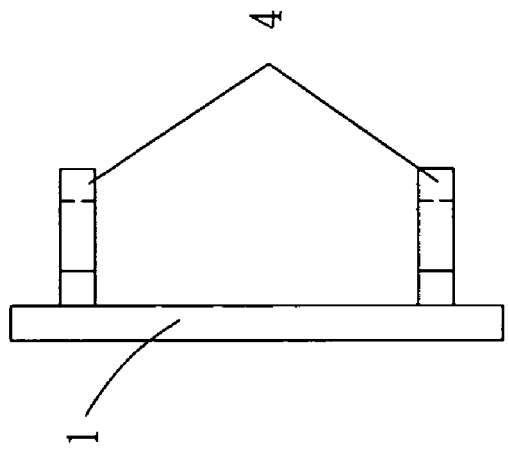
FIG. 1 is a front view of each connection member of the frame assembly of the present invention.
Figure 2:
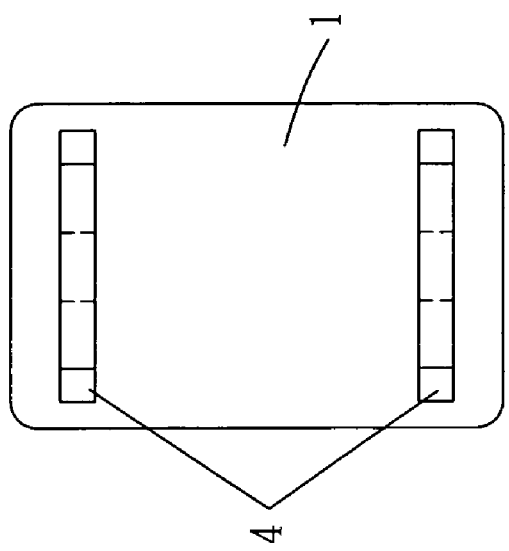
FIG. 2 is a side view of each connection member of the frame assembly of the present invention.
Figure 3:
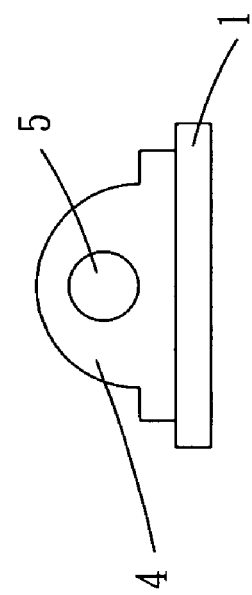
FIG. 3 is a top view of each connection member of the frame assembly of the present invention.
Figure 4:
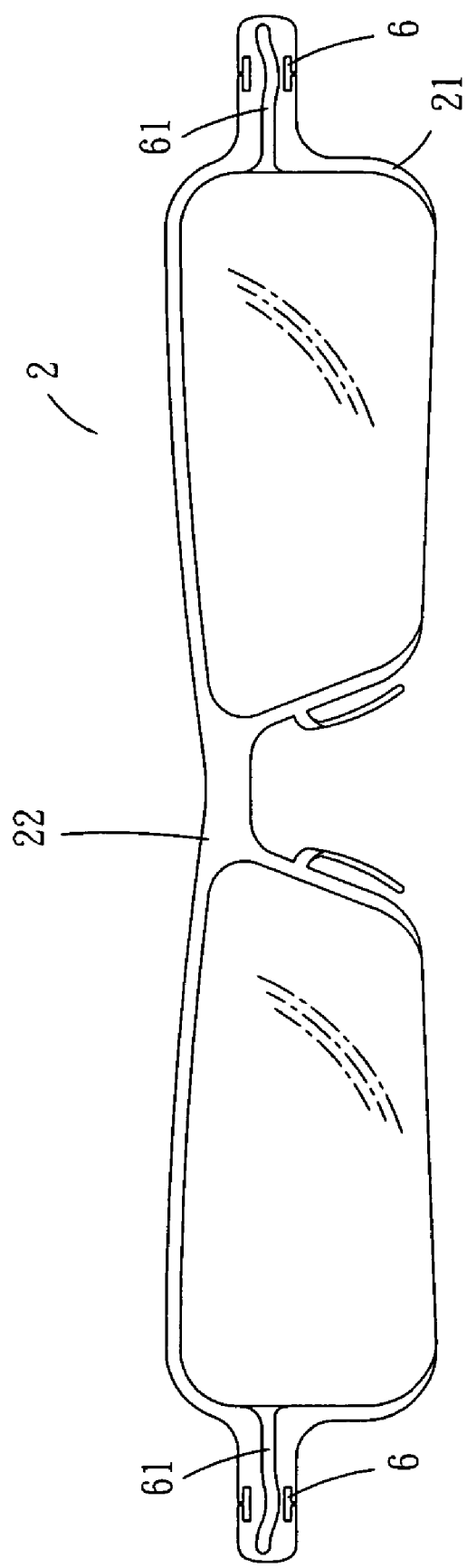
FIG. 4 is a front view of the frame of the present invention.
Figure 5:
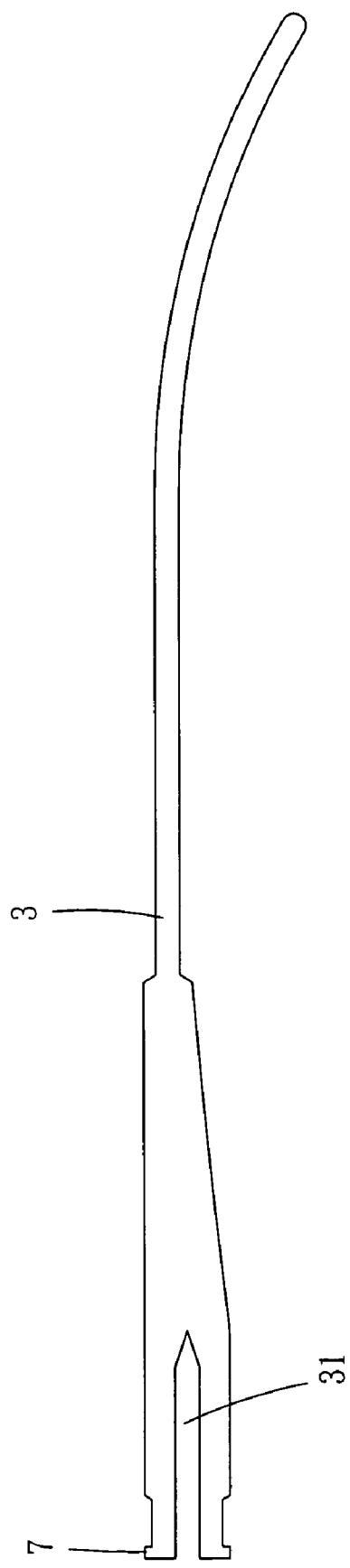
FIG. 5 shows a side view of the temple of the frame assembly.
Figure 6:
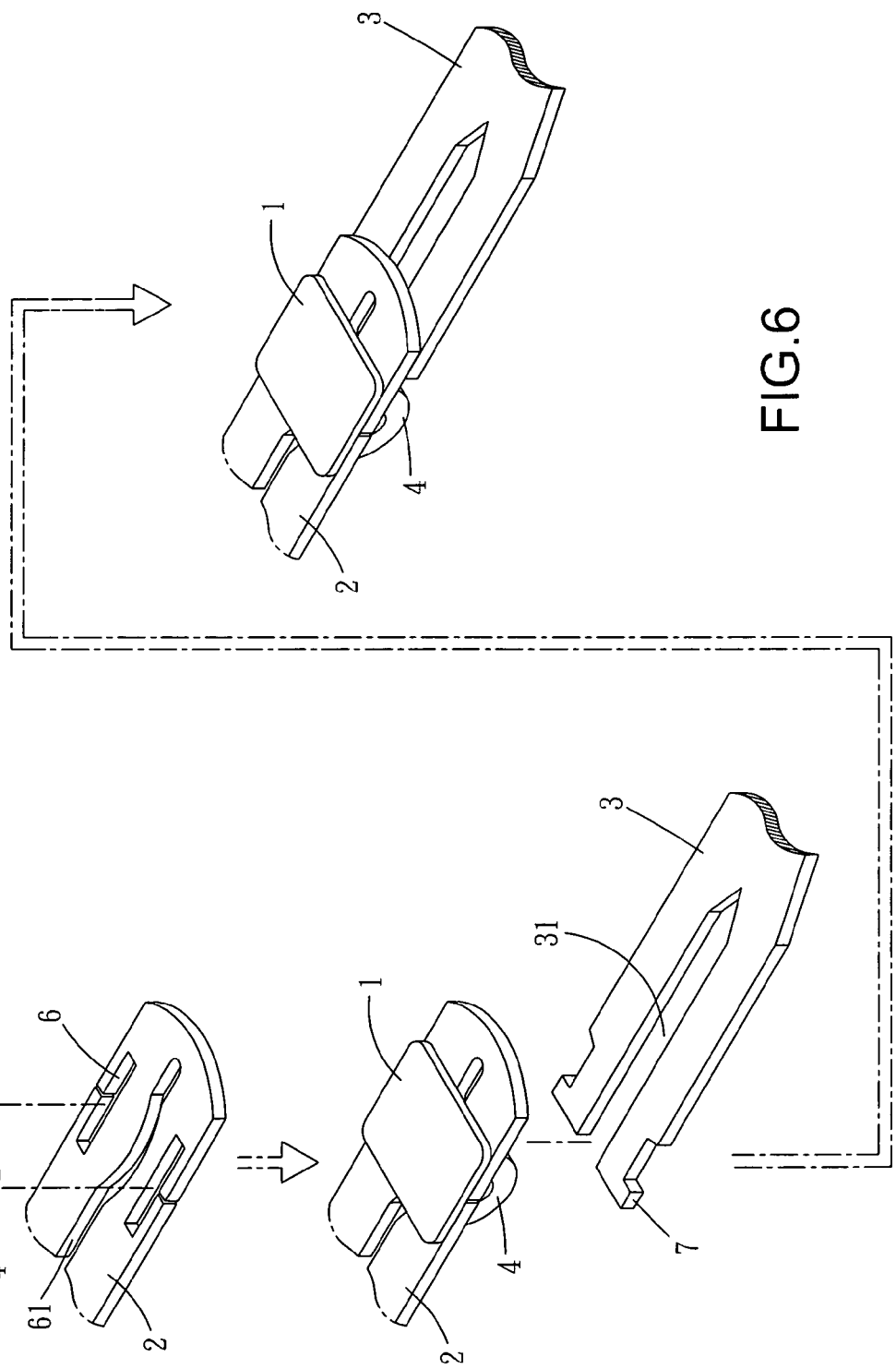
FIG. 6 shows steps for installing the connection member and the temple of the frame assembly of the present invention.

Referring to FIGS. 1 to 6, the frame assembly for eyeglasses of the present invention comprises a frame 2 including two rims 21 and a bridge 22 is connected between the two rims 21. Two extensions extend from two ends of the frame 2 and each extension has two slots 6. Each extension has a first slit 61 defined therein and the first slit 61 communicates with a space enclosed by the rim 21.

Two connection members each have a board 1 and two lugs 4 extend from one side of the board 1. Each lug 4 has a hole 5 defined therethrough. The two lugs 4 of each connection member are inserted into the two slots 6 corresponding thereto.

Two temples 3 each have a second slit 31 defined longitudinally in one end thereof so as to defined two flexible parts, and each part has a protrusion 7 extending from an outside thereof. The two flexible parts of each temple 3 are squeezed toward each other and located between the two lugs 4 of each connection member. The two protrusions 7 are then engaged with the two holes 5 of the two lugs 4 of each connection member by releasing the two flexible parts to connect the temples 3 to the extensions of the frame 2.

While we have shown and described the embodiment in accordance with the present invention, it should be clear to those skilled in the art that further embodiments may be made without departing from the scope of the present invention.

What is claimed is:

1. A frame assembly for eyeglasses, comprising:
   a frame including two rims and a bridge connected between the two rims, two extensions extending from two ends of the frame and each extension having two slots;
   two connection members each having a board and two lugs extending from one side of the board, each lug having a hole defined therethrough, the two lugs of each connection member inserted into the two slots corresponding thereto, and
   two temples each having a first slit defined longitudinally in one end thereof so as to define two flexible parts, each part having a protrusion extending from an outside thereof, the two flexible parts of each temple located between the two lugs of each connection member and the two protrusions engaged with the two holes of the two lugs of each connection member.

2. The assembly as claimed in claim 1, wherein each extension has a second slit defined therein and the second slit communicates with a space enclosed by the rim.

* * * * *